United States Patent Office 3,793,251
Patented Feb. 19, 1974

3,793,251
SATURATED HYDROCARBON AVERAGING
Thomas R. Hughes, Orinda, Calif., assignor to Chevron Research Company, San Francisco, Calif.
No Drawing. Continuation of application Ser. No. 149,068, June 1, 1971, and a continuation-in-part of application Ser. No. 864,870, Oct. 8, 1969, both now abandoned. This application Feb. 7, 1973, Ser. No. 330,535
Int. Cl. C07c *3/00, 9/00*
U.S. Cl. 260—676 R                    24 Claims

ABSTRACT OF THE DISCLOSURE

A process for averaging saturated hydrocarbon feed components of different molecular weight to components of intermediate molecular weight relative to the feed components which comprises contacting the saturated hydrocarbon feed components at a temperature between about 400° and 850° F. in a reaction zone with a catalytic mass comprising a Group VI–B metal component and a Group VIII metal component, and maintaining the olefin concentration in the reaction zone sufficiently low to produce in the reaction zone a saturated hydrocarbon product containing said components of intermediate molecular weight and containing less than 5 mole percent olefin. Preferably the catalytic mass contains platinum on alumina (platinum being the Group VIII metal component); and tungsten oxide on silica (tungsten oxide being the Group VI–B metal component).

Low olefin concentrations in the reaction zone are crucial in the process of the present invention.

CROSS-REFERENCES

This is a continuation of application Ser. No. 149,068, now abandoned, filed June 1, 1971.

This application is a continuation-in-part of Ser. No. 864,870 now abandoned, filed Oct. 8, 1969. The disclosure of Ser. No. 864,870 now abandoned is hereby incorporated by reference into the present patent application.

The continuation-in-part application of Ser. No. 864,871, filed on or about June 2, 1971, titled "Saturated Hydrocarbon Conversion," is related to the present application and is hereby incorporated by reference into the present application.

BACKGROUND OF THE INVENTION

Field of the invention

The present invention relates to the conversion of saturated hydrocarbon feeds to hydrocarbon products with different molecular weights than those of the feed hydrocarbons. More particularly, the present invention relates to the conversion of saturated hydrocarbons of at least two different molecular weights to hydrocarbons of intermediate molecular weight by means of an averaging reaction.

The term "averaging" is used in the specification to mean the conversion of saturated feed components or saturated hydrocarbon molecules of different molecular weight to components of intermediate molecular weight relative to the saturated feed components. For example, in an averaging reaction between butane and hexane, the butane and hexane are converted to pentane.

"Saturated hydrocarbon feed component" as used herein includes hydrocarbon molecules which are completely saturated with hydrogen and/or hydrocarbon molecules which are partially saturated with hydrogen but contain at least one alkyl group which is completely saturated with hydrogen. In the case of molecules which are partially unsaturated but containing a saturated group, the term "saturated hydrocarbon feed component" refers to the saturated group of the molecule. Thus the term "saturated hydrocarbon feed component" as used herein applied to various molecules such as alkanes (paraffins), branched-chain alkanes, alicyclic hydrocarbons (cycloparaffins) with one or more attached alkyl groups containing at least two carbon atoms, and unsaturated hydrocarbons with one or more attached, completely saturated hydrocarbon groups, as, for example, an aromatic hydrocarbon with an attached alkyl group. From the description hereinbelow, it will become apparent that in the instance of unsaturated hydrocarbons with an attached, completely saturated hydrocarbon group, the conversion process of the present invention operates by way of the completely saturated hydrocarbon group. Also, as will be seen to follow naturally from the description of the invention hereinbelow, the term "saturated hydrocarbon component" is not used herein to include molecules which have an olefinic constituent, and similarly is not used to include molecules which have an acetylenic constituent.

Description of the prior art

Averaging of saturated hydrocarbons or paraffinic hydrocarbons to form hydrocarbons of intermediate molecular weight has been carried out, according to prior art, using acidic catalysts, such as boron fluoride-hydrogen fluoride catalyst. For example, U.S. Pat. 2,216,274 discloses a process for interacting relatively high molecular weight paraffin hydrocarbons with lower molecular weight isoparaffin hydrocarbons to form paraffin hydrocarbons of intermediate molecular weight by contacting the feed hydrocarbons with a catalytic material consisting essentially of boron fluoride and hydrogen fluoride at temperatures between about —30° and +150° C.

A number of other patents disclose paraffin averaging reactions using a catalyst comprised essentially of boron fluoride and hydrogen fluoride or boron fluoride, hydrogen fluoride and water. These patents include U.S. Pats. 2,296,371, 2,405,993, 2,405,994, 2,405,995, 2,405,996, and 2,405,997. The disclosures of the above cited U.S. patents relating to averaging reactions are hereby incorated by reference into the present patent application, particularly those parts of the disclosures relating to preferred feed components to be reacted or interacted in an averaging reaction to produce hydrocarbons of intermediate molecular weight.

Numerous processes have also been disclosed using acidic-type catalysts for the disproportionation of saturated hydrocarbons.

Disproportionation is recognized as a distinct reaction in the hydrocarbon processing industry. For example, in U.S. Pat. 3,340,322, disproportionation is defined as the conversion of a hydrocarbon into similar hydrocarbons of both higher and lower numbers of carbon atoms per molecule. Averaging is often though of as the reverse reaction of disproportionation. Sometimes averaging may be considered as the same type of reaction as disproportionation from the standpoint of reaction mechanism.

Catalysts which have been used in the past for disproportionation of saturated hydrocarbons include solid catalysts comprised of $AlCl_3$ on alumina, boron fluoride with hydrogen fluoride and boron fluoride together with a promoter comprised of alkyl fluoride. The use of aluminum chloride solid catalyst was uneconomic because, among other reasons, the catalyst was nonregenerable. The use of either boron fluoride with hydrogen fluoride or boron fluoride with an alkyl fluoride was unattractive because of severe corrosion, sludge formation and other operating problems.

U.S. Pat. 3,445,451 discloses a process for the dehydrogenation-disproportionation of olefins and paraffins, using a combined dehydrogenation and disproportionation catalyst. According to U.S. Pat. 3,445,541, a hydrocarbon feed which is either an acyclic paraffin or acyclic olefin having 3-6 carbon atoms is contacted with the catalyst at conditions of temperature and pressure to promote dehydrogenation and disproportionation. It is said that the process can be carried out at temperatures between 800° and 1200° F.; however, the lowest temperature used for processing a paraffin in accordance with any of the examples of U.S. Pat. 3,445,541 is 980° F. and typically, the temperature used is between 1040° and 1125° F. In run 22 of U.S. Pat. 3,445,451 the temperature used is 900° F. and the feedstock is propylene; that is, the feedstock is an olefin. Olefin feedstocks as well as substantial formation of olefins in the reaction zone are antithetic to the process of the present invention, as will be seen in more detail from the description of the present invention below.

Also, the feed which is converted in the examples of U.S. Pat. 3,445,541 consists of only one feed component in each of the experimental runs; that is, the feed used in the examples was either propane or propylene. Averaging reactions are not described or disclosed in U.S. Pat. 3,445,541.

SUMMARY OF THE INVENTION

According to the present invention a process is provided for averaging saturated hydrocarbon feed components of different molecular weight to components of intermediate molecular weight relative to the feed components which comprises contacting the saturated hydrocarbon feed components at a temperature between about 400° and 850° F. in a reaction zone with a catalytic mass comprising a Group VI-B metal component and a Group VIII metal component, and maintaining the olefin concentration in the reaction zone sufficiently low to produce in the reaction zone a saturated hydrocarbon product containing said components of intermediate molecular weight and containing less than 5 mole percent olefin.

I have found that it is preferred to carry out the averaging reaction of the present invention below 800° F.; for example between 400° and 800° F. Also, I have found that a particularly preferred catalyst composition for use in the process of the present invention comprises platinum on alumina as the alkane dehydrogenation component and tungsten oxide on silica as the olefin averaging component.

The process of the present invention is based on a number of findings. Among the most important findings is that the olefins in the reaction zone must be maintained low in order to avoid substantially inhibiting the averaging reaction for the formation of saturated hydrocarbon products from saturated hydrocarbon feed components. It is specifically preferred in the process of the present invention to maintain the olefin concentration in the reaction zone sufficiently low to produce a saturated hydrocarbon product containing less than 5 mole percent olefins. I have found that it is even more preferable to maintain olefin concentrations sufficiently low so that the reaction zone product will contain less than 3 mole percent olefins. It, of course, naturally follows that in order to produce a product containing less than 5 mole percent olefins the olefin level in the reaction zone must be maintained below 5 mole percent. For my invention I specifically require that the olefin concentration in the reaction zone be maintained below 5 mole percent of the hydrocarbons. It is crucial for my invention to maintain the olefin concentration in the reaction zone quite low. The olefin concentration in the product is referred to rather than the olefin concentration in the reaction zone because measurement of the reaction zone product is perhaps the most natural way to measure the olefin concentration in the reaction zone.

Another important finding upon which the present invention is based is that the temperature must be kept relatively low in order to attain an attractive process for the averaging of saturated hydrocarbon feed components.

The relatively low temperatures employed in the process of the present invention are not only critical in that they operate to achieve low olefin concentrations in the reaction zone, but also the lower temperature has been found to reduce the fouling rate of my catalyst and to improve the selectivity toward production of saturated hydrocarbon feed components intermediate to the feed saturated hydrocarbon components and avoid production of light ends.

Specific temperatures employed in the process of the present invention include temperatures between 400° and 850° F., preferably the temperature is below 800° F., for example 400° to 799° F.; and I have found that it is even more advantageous from the standpoint of long catalyst life and high selectivity to intermediate products to use a temperature of 775° F. or lower, for example 400° to 775° F.

A particularly preferred embodiment of the present invention is based on my further finding that a catalyst mass comprising platinum on alumina and tungsten oxide on silica gives unexpectedly high yields of intermediate products under the process conditions of the present invention indicated above.

In general, the catalyst mass using the process of the present invention must contain a Group VIII metal component and a Group VI-B metal component.

The term "metal component" is used herein to include a metal from the specified group in the elemental form or in compound form. Preferably, the Group VIII metal component is a platinum group metal or compound thereof. The platinum group includes platinum, palladium, iridium, rhodium, osmium, and ruthenium. The Group VI-B component is tungsten or molybdenum or compounds thereof, most desirably as the oxide.

Suitable pressures for use in the averaging reaction zone are between about atmospheric and 2500 p.s.i.a., and more usually between about 100 and 1500 p.s.i.a.

Although the process can be applied to the various saturated hydrocarbons as defined hereinabove, the process is preferably carried out using alkanes as the saturated hydrocarbon feed. The term "alkanes" is used herein to mean open chain hydrocarbons from the group of aliphatic hydrocarbons of the series $C_nH_{2n+2}$, excluding methane. Hence according to a preferred embodiment of the present invention, the saturated hydrocarbon feed comprises two different molecular weight alkanes, or alkanes in at least two different molecular weight ranges. According to a particularly preferred embodiment of the present invention, the saturated hydrocarbon feed which is averaged comprises normally gaseous alkanes and normally liquid alkanes. Preferably the normally gaseous alkanes consist essentially of propane or normal butane, or isobutane, or mixtures thereof; and the normally liquid alkanes consist essentially of normal or branched-chain pentanes, or hexanes, or heptanes, or octanes or higher molecular weight alkanes up to about $C_{30}$, or mixtures thereof.

In some instances, it is desirable to apply the process of the present invention to two or more liquid alkanes; examples of such feed mixtures are $C_5$, $C_6$ and/or $C_7$ alkanes, together with naphtha boiling-range hydrocarbons or kerosene boiling-range hydrocarbons.

The process of the present invention is particularly advantageously applid to interacting or averaging light alkanes such as $C_3$'s, $C_4$'s, or $C_5$'s with heavier hydrocarbons such as naphthas or kerosene boiling-range hydrocarbons. For example, interacting such light alkanes with hydrocarbon fractions boiling mainly near the higher end of the gasoline boiling range would give, by the present process, a product largely in the gasoline boiling range and having an increased octane number where the initial gasoline fraction has a low octane. In accordance with a particularly preferred embodiment of the present invention, $C_4$ alkanes are interacted with a paraffin-rich naphtha, preferably a naphtha rich in $C_7$ to $C_9$ hydrocarbons. A Kuwait naphtha which is rich in paraffin containing for example, 65–80 percent paraffins, 15–30 percent naphthenes, and about 5 percent aromatics, is a particularly preferred paraffin-rich naphtha feedstock for the process of the present invention. A raffinate from aromatic extraction, for example from the extraction of xylenes from a hydrocarbon mixture, is also a particularly preferred paraffin-rich feedstock for the process of the present invention. Another desirable feed is a mixture of $C_3$ to $C_5$ hydrocarbons and a wax or waxy fraction, for example of about 20 carbon atoms, which by the present averaging process can be converted to acceptable jet fuel.

I have found that a catalyst mass which comprises a physical mixture of catalyst particles containing a Group VIII metal component and catalyst particles containing a Group VI–B metal component is effective for averaging saturated hydrocarbon components in accordance with the process of the present invention. The two types of catalyst particles which can be used for the catalyst mass, in that instance where the catalyst mass is a physical mixture, should be in close proximity to one another. By "close proximity" is meant a distance of less than a few inches and preferably of the order of an inch or less. More intimate mixtures can be obtained by mixing or grinding together fine powders of the two kinds of catalyst particles. In certain instances rather than making up the catalyst mass by physical admixture of two types of catalyst particles, it is more convenient and more desirable to use only one type of catalyst particles comprising both the Group VIII metal component and Group VI–B component.

The catalytic mass used in the averaging reaction zone preferably comprises a platinum group metal or metal compound on a refractory support and a Group VI–B metal or metal compound on a refractory support. For example, especially suitable for use in the present process are catalytic masses formed of mixtures of platinum on alumina particles and tungsten-oxide-on-silica particles.

Other Group VI–B metals include molybdenum and chromium while other Group VIII metals include palladium, osmium, rhodium, ruthenium and iridium. These metal components may be in the metallic form or in compound form such as, for example, the oxide or sulfide form. The metallic form is preferred for the Group VIII metal compounds and the oxide is preferred for the Group VI–B metal compounds.

Other metal components, modifiers and/or promoters, can be present and associated with either or both the Group VI–B metal component and Group VIII metal component. For example, there may be present Sn or Re. Particularly desirable is the combination of $WO_3$ on $SiO_2$ together with Pt, Li on $Al_2O_3$.

The particles making up the catalytic mass can be prepared in any suitable manner for obtaining catalytically active amounts of the metal components such as in the form of a dispersion or deposit on a suitable carrier. Thus, platinum or other Group VIII metal can be associated with a porous inorganic oxide carrier by impregnation, cogellation, coprecipitation or ion exchange and converted to metal form by reduction. For the Group VI–B component, there can be used supported tungsten oxide prepared by impregnation, cogellation, or coprecipitation as from a water soluble tungstate with subsequent calcination.

The porous solid carrier or support employed in the preparation of the catalyst mass can be, for example, silica, alumina, charcoal, or carbon, but is preferably a high surface area inoragnic oxide carrier, i.e., refractory oxide.

Although the process of the present invention can use a catalytic component which has dehydrogenation activity it should be noted that the reaction conditions employed in the process of the present invention, particularly the preferred low temperature for carrying out the overall averaging reaction, are not favorable conditions for the net dehydrogenation of a substantial fraction of feed alkanes, but rather are such as to minimize net dehydrogenation. Keeping net dehydrogenation low (i.e., net olefin production low) *as determined by the reaction zone effluent* is crucial in the process of the present invention. More particularly, it is crucial in the process of the present invention to operate under conditions which will keep the olefin concentration low in the reaction zone.

It is usually preferred in the process of the present invention that the portion of the catalytic mass containing the Group VIII metal component has a relatively low acidity, that is, low H+ donating value in the case of Bronsted acids, or low capacity to form strong coordinate covalent bonds to Lewis bases in the case of Lewis acids. This may be accomplished by the addition of a small amount of alkali metal oxide (such as lithium oxide) or alkaline earth oxide to the Group VIII metal containing portion or component of the catalytic mass. It is usually preferred in the process of the present invention that essentially the entire catalytic mass have a relatively low acidity.

Examples of catalyst supports and catalysts of low acidity include $Al_2O_3$ with an alkali metal or alkali metal oxide of lithium, sodium, or potassium to poison the acidic activity of the alumina catalyst support; essentially pure $Al_2O_3$; essentially pure $SiO_2$; or either the pure $Al_2O_3$ or pure $SiO_2$ refractory supports with a metal deposited thereon, such as a metal selected from Groups VI–B or VIII of the Periodic Table. Examples of catalysts of high or moderate acidity include $AlCl_3$ on $Al_2O_3$; fluorided $Al_2O_3$; hydrogen mordenite; HF or an alkyl fluoride together with $BF_3$ the hydrogen, rare earth or decationized forms of Y-zeolite; and $SiO_2$ together with $Al_2O_3$.

EXAMPLE 1

The following conditions were employed in a laboratory run for the averaging of saturated hydrocarbons:

Feed: Normal butane and normal octane
Volume of catalyst in reactor: 9 cubic centimeters (cc.)
Catalyst: 2 cc. of 0.5 wt. percent Pt, 0.5 wt. percent Re, and 0.5 wt. percent Li on $Al_2O_3$; and 7 cc. of 8.0 wt. percent $WO_3$ on $SiO_2$, for a total of 9 cc. of catalyst. Both types of catalyst particles were 28 to 60 Tylermesh size, and the catalyst particles were uniformly mixed together.
Operating conditions:
   Temperature: 800° F.
   Pressure: 900 p.s.i.g.
   Feed-rate: 3 cc./hour of normal butane
             6 cc./hour of normal octane The product as shown below in Table I was obtained after operating for one hour in accordance with the above operating conditions.

TABLE I

| Product [1]: | Weight percent |
|---|---|
| $C_2H_6$ | 1.10 |
| $C_3H_8$ | 6.26 |
| $C_4H_{10}$ | 20.60 |
| $C_5H_{12}$ | 9.95 |
| $C_6H_{12}$ | 9.72 |
| $C_7H_{16}$ | 9.24 |
| $C_8H_{18}$ | 21.75 |
| $C_9H_{20}$ | 6.87 |
| $C_{10}H_{22}$ | 5.00 |
| $C_{11}H_{24}$ | 3.52 |
| $C_{12}H_{26}$ | 2.60 |
| $C_{13}$ to $C_{16}$ | 2.89 |

[1] Before analysis, the product was hydrogenated over a platinum-silica catalyst so that all product components were measured as alkanes (approximately one weight percent olefins was present in the total product before hydrogenating).

The above results illustrate the effectiveness of the process of the present invention for averaging saturated hydrocarbons to obtain intermediate molecular weight hydrocarbons. A yield of 28.91 weight percent intermediate ($C_5$, $C_6$ and $C_7$) hydrocarbons was obtained in nonrecycle operation at a temperature of 800° F., thus supporting the effectiveness of the operation of the present invention at relatively low temperatures compared to, for example, those used in the process of U.S. Pat. 3,445,541.

EXAMPLE 2

Table II below compares results for four runs at varying n-octane to n-butane feed ratios. The operating conditions were the same as those set out in Example 1, except for the ratio of n-$C_8$ to n-$C_4$.

TABLE II

| Feed (vol. percent) | | Products (wt. percent) | | | Intermediate product (wt. percent) |
| --- | --- | --- | --- | --- | --- |
| $C_8$ | $C_4$ | $C_5$ | $C_6$ | $C_7$ | Total of $C_5$, $C_6$ and $C_7$ |
| 0 | 100 | 13 | 7 | 4 | 24 |
| 33 | 67 | 13 | 10.5 | 7.5 | 31 |
| 67 | 33 | 10 | 10.5 | 9.5 | 29 |
| 100 | 0 | 7 | 8 | 9 | 24 |

The results shown above in Table II illustrate that the n-$C_8$ and n-$C_4$ feed constituents interact to form intermediate products, i.e., $C_5$, $C_6$ and $C_7$'s. If the n-$C_8$, n-$C_4$ feed was simply disproportionated, a yield of about 24 weight percent $C_5$, $C_6$, $C_7$ intermediate product would be obtained. When 100% n-$C_4$ is fed (and thus disproportionated) a yield of 24 weight percent $C_5$, $C_6$, $C_7$ is obtained. When 100% n-$C_8$ is fed (and thus disproportionated) a yield of 24 weight percent n-$C_5$, $C_6$, $C_7$ is obtained. But when a mixture of n-$C_4$ and n-$C_8$ is fed, a yield of about 29 to 31 wt. percent $C_5$, $C_6$, $C_7$ is obtained. The increase of about 25 weight percent $C_5$, $C_6$, $C_7$ when the mixture of n-$C_4$ and n-$C_8$ is fed illustrates that the n-$C_4$ and n-$C_8$ are interacting or undergoing averaging reaction in accordance with the process of the present invention, rather than simply being disproportionated.

EXAMPLE 3

In this example, normal butane is averaged with a raffinate composed primarily of $C_8$ and $C_9$ paraffins.

The $C_4$ hydrocarbons can be obtained from various sources such as petroleum distillates or from excess butanes from hydrocracking or catalytic reforming or other refinery process operations. The raffinate used in this example was a raffinate left after solvent extraction of aromatics from a portion of the effluent from a catalytic reforming process.

The conditions used to carry out the averaging reactions included a temperature of about 800° F., a pressure of about 900 p.s.i.g., a feed rate of about 9 cubic centimeters per hour of 1 part by volume raffinate with 2 parts by volume normal butane, a liquid hourly space velocity of 1.0 and catalyst consisting of 2 parts by volume of a 0.5 weight percent platinum plus 0.5 weight percent lithium on alumina together with 7 parts by volume of 8.0 percent tungsten oxide (calculated as tungsten) on silica.

The feed composition and the product or result of the averaging reaction are shown in Table III below. Of the 63 percent butane in the feed, over 39 percent was converted to products of different carbon number. The $C_5+$ liquid content increased 28 percent, from 37 percent in the feed to 65 percent in the product. Essentially all of this net increase in liquid content was in the $C_5$ to $C_7$ range intermediate in molecular weight between the light and heavy feed components. Thus averaging was the main result of the process. The 9 percent increase in $C_{10}+$ is not due to averaging, but to a relative small amount of disproportionation accompanying the averaging. Most of the 11 percent of $C_1$ to $C_3$ paraffins produce was propane, which can advantageously be used in liquified petroleum gas (LPG).

TABLE III

| Components | Feed, wt. percent | Product, wt. percent | Net change | |
| --- | --- | --- | --- | --- |
| $C_1$ | | 0.53 | +0.53 | |
| $C_2$ | | 1.71 | +1.71 | $\Delta(C_1-C_3)=+11.26\%$ |
| $C_3$ | | 9.02 | +9.02 | |
| i-$C_4H_{10}$ | | 1.06 | +1.06 | |
| n-$C_4H_{10}$ | 63.17 | 22.93 | −40.24 | $\Delta C_4=-39.18\%$ |
| i-$C_5$—$H_{12}$ | | 2.49 | +2.49 | |
| n-$C_5$—$H_{12}$ | | 8.30 | +8.30 | |
| br-$C_6H_{14}$ | | 3.53 | +3.53 | $\Delta(C_5-C_7)=+28.20\%$ |
| n-$C_6H_{14}$ | | 5.81 | +5.81 | |
| br-$C_7H_{16}$ | 0.10 | 4.52 | +4.42 | |
| n-$C_7H_{16}$ | 0.67 | 4.32 | +3.65 | |
| br-$C_8H_{18}$ | 17.43 | 9.77 | −7.66 | |
| n-$C_8H_{18}$ | 3.80 | 2.91 | −0.89 | $\Delta(C_8-C_9)=-9.47\%$ |
| br-$C_9H_{20}$ | 10.43 | 9.68 | −0.75 | |
| n-$C_9H_{20}$ | 1.37 | 1.20 | −0.17 | |
| br-$C_{10}H_{22}$ | 1.79 | 6.92 | +5.13 | |
| n-$C_{10}H_{22}$ | 0.27 | 0.20 | −0.07 | $\Delta C_{10}+=+9.30\%$ |
| $C_{11}+$ | 0.98 | 5.11 | +4.13 | |

EXAMPLE 4

In this example, a paraffinic-rich raffiniate comprising mostly $C_8$ and $C_9$ hydrocarbons was averaged with a paraffin in the range $C_{10}$ to $C_{20}$, specifically n-hexadecane ($C_{16}$). The reaction conditions were substantially the same as those used in the previous example, except that the temperature was 700° F. instead of 800° F. The feed to the reaction zone was 50 volume percent of $C_8$–$C_9$ rich raffinate containing 82.1% paraffins, 12.3% naphthenes, and 5.7% alkyl benezmes, and 50 volume percent n-hexadecane.

With only one pass through the reactor, over 25 weight percent of the feed was converted to material boiling between the raffinate and n-hexadecane, specifically between about 350° F. and 550° F. Thus a relatively high yield of saturated hydrocarbons (jet fuel hydrocarbons) was obtained with only one pass operation. It is preferable to recycle most or all of the unconverted hydrocarbons boiling above 550° F. for averaging with raffinite to convert the unconverted 550° F.+ hydrocarbons to jet fuel and lighter hydrocarbons.

In the one pass operation, substantial amounts of gasoline boiling range hydrocarbons are produced in addition to the jet fuel boiling range hydrocarbons. The gasoline boiling range hydrocarbons can be withdrawn for use as gasoline blending stock or for further processing to increase the octane rating of the gasoline boiling range hydrocarbons, or the gasoline boiling range hydrocarbons can be recycled for further averaging.

A small amount of very light hydrocarbons are produced in any case, and these very light hydrocarbons can be used as LPG.

Although various embodiments of the invention have been described, it is to be understood they are meant to be illustrative only and not limiting. Certain features may be changed without departing from the spirit or essence of the invention. The present invention has broad application to the averaging of saturated hydrocarbon decomponents, particularly to the averaging of alkanes. Accordingly, the invention is not to be construed as limited to the specific embodiments or examples discussed, but only as defined in the appended claims or substantial equivalents thereto.

What is claimed is:

1. A process for averaging saturated hydrocarbon feed components of different molecular weight to components of intermediate molecular weight relative to the feed components which comprises contacting the saturated hydrocarbon feed components at a temperature between about 400° and 850° F. in a reaction zone with a catalytic mass comprising a Group VI–B metal component and a Group VIII metal component, and maintaining the olefin concentration in the reaction zone sufficiently low to produce in the reaction zone a saturated hydrocarbon product containing said components of intermediate molecular weight and containing less than 5 mole percent olefin.

2. A process in accordance with claim 1 wherein the catalytic mass comprises a physical mixture of (a) catalyst particles containing a Group VI–B metal component and (b) catalyst particles containing a Group VIII metal component.

3. A process in accordance with claim 1 wherein the saturated hydrocarbons are contacted with said catalytic mass in a reaction zone at a temperature below 800° F.

4. A process in accordance with claim 1 wherein the temperature within the reaction zone is maintained at 775° or lower.

5. A process in accordance with claim 1 wherein the olefin concentration in the reaction zone is maintained sufficiently low to produce a saturaetd hydrocarbon product containing less than 3 mole percent olefin.

6. A process in accordance with claim 5 wherein the temperature in the reaction zone is maintained between 400° and 799° F.

7. A process in accordance with claim 1 wherein the catalytic mass comprises a platinum group component on a refractory support and a Group VI–B metal component on a refractory support.

8. A process in accordane with claim 1 wherein the catalytic mass comprises platinum on alumina and tungsten oxide on silica.

9. A process in accordane with claim 1 wherein essentially the entire catalytic mass has a low acidity.

10. A process in accordance with claim 2 wherein (a) the catalyst particles in containing the Group VI–B metal component comprise tungsten oxide on silica and (b) the catalyst particles containing the Group VIII metal component comprise platinum on alumina.

11. A process in accordance with claim 2 wherein essentially the entire catalytic mass has a low acidity.

12. A process in accordance with claim 1 wherein the saturated hydrocarbons consist essentially of alkanes.

13. A process in accordance with claim 1 wherein the saturated hydrocarbons consist of light hydrocarbons such as propane, or normal butane, or isobutane or mixtures of any of those hydrocarbons; and heavier alkanes such as normal or branched-chain: pentanes, or hexanes, or heptanes, or octanes, or higher molecular weight alkanes up to about $C_{30}$, or mixtures of any of those normally liquid hydrocarbons.

14. A process for averaging feed alkanes of different molecular weight (and of molecular weight higher than propane) to alkanes of intermediate weight relative to the feed alkanes which comprises contacting the feed alkanes at a temperature between 400° and 850° F. in a reaction zone with a catalytic mass comprising a Group VI–B metal component and a Group VIII metal component, and maintaining the olefin concentration in the reaction zone sufficiently low to produce in the reaction zone an alkane product containing said alkanes of intermediate molecular weight and containing less than 5 mole percent olefin.

15. A process in accordance with claim 14 wherein the temperature in the reaction zone is maintained between 400° and 799° F.

16. A process in accordance with claim 14 wherein the temperature is maintained at 775° F. or lower.

17. A process in accordance with claim 14 wherein the temperature is maintained between 400° and 799° F. and wherein the olefin concentration in the reaction zone is maintained sufficiently low to produce in the reaction zone an alkane product containing less than 3 mole percent olefin.

18. A process in accordance with claim 14 when the feed alkanes comprise normal butane and normal octane.

19. A process in accordance with claim 14 wherein the feed alkanes to the reaction zone contain no more than about 5 mole percent olefins.

20. A process in accordance with claim 14 wherein the temperature in the reaction zone is maintained between about 650° F. and 850° F.

21. A process in accordance with claim 14 wherein the catalytic mass comprises platinum on alumina and tungsten oxide on silica.

22. A process in accordance with claim 14 wherein the catalytic mass comprises platinum and lithium on alumina and tungsten oxide on silica.

23. A process in accordance with claim 14 wherein the catalytic mass comprises a physical mixture of (a) catalyst particles containing a Group VI–B component and (b) catalyst particles containing a Group VIII metal component.

24. A process in accordance with claim 23 wherein (a) the catalyst particles containing the Group VI–B metal component comprise tungsten oxide on silica and (b) the catalyst particles containing the Group VIII metal component comprise platinum on alumina.

References Cited
UNITED STATES PATENTS

| | | | |
|---|---|---|---|
| 3,445,541 | 5/1969 | Heckelsberg et al. | 260—683 D |
| 3,261,879 | 7/1966 | Banks | 260—683 D |
| 3,446,868 | 5/1969 | Box | 260—676 |
| 3,484,499 | 12/1969 | Lester | 260—673 |
| 3,668,268 | 6/1972 | Mulaskey | 260—676 |

DELBERT E. GANTZ, Primary Examiner

J. M. NELSON, Assistant Examiner

U.S. Cl. X.R.

260—683 D

PO-1050
(5/69)

UNITED STATES PATENT OFFICE
CERTIFICATE OF CORRECTION

Patent No. 3,793,251         Dated February 19, 1974

Inventor(s) Thomas R. Hughes

It is certified that error appears in the above-identified patent and that said Letters Patent are hereby corrected as shown below:

Col. 2, line 4, "applied" should read --applies--.

Col. 2, lines 24-25, "moleculare" should read --molecular--.

Col. 2, lines 42-43, "incorated" should read --incorporated--.

Col. 4, line 62, "particudarly" should read --particularly--.

Col. 5, line 66, "inoragnic" should read --inorganic--.

Col. 7, line 75, "produce" should read --produced--.

Col. 8, Table III, Col. 4, "+9,30%" should read --+9.30%--.

Col. 8, line 29, "beneznes" should read --benzenes--.

Col. 9, Claim 4, "775°" should read --775°F.--.

Col. 9, Claim 5, "saturaeted" should read --saturated--.

Col. 9, Claim 8, "accordane" should read --accordance--.

Col. 9, Claim 9, "accordane" should read --accordance--.

Col. 9, Claim 10, "particles in containing" should read --particles containing--.

Signed and sealed this 1st day of October 1974.

(SEAL)
Attest:

McCOY M. GIBSON JR.
Attesting Officer

C. MARSHALL DANN
Commissioner of Patents